(12) United States Patent
Biswas et al.

(10) Patent No.: US 8,355,398 B2
(45) Date of Patent: Jan. 15, 2013

(54) TRANSPORTING REAL TIME VIDEO FRAMES OVER AN ETHERNET NETWORK

(75) Inventors: Tapabrata Biswas, Sunnydale, CA (US); Sanjoy Kumar Poddar, Cupertino, CA (US); Saurin Suthar, Santa Clara, CA (US); David A. Pearson, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 425 days.

(21) Appl. No.: 12/689,328

(22) Filed: Jan. 19, 2010

(65) Prior Publication Data

US 2011/0176542 A1 Jul. 21, 2011

(51) Int. Cl.
*H04L 12/56* (2006.01)
(52) U.S. Cl. ........................................................ 370/389
(58) Field of Classification Search .................... 370/389
See application file for complete search history.

(56) References Cited

U.S. PATENT DOCUMENTS

| | | | |
|---|---|---|---|
| 4,734,764 A * | 3/1988 | Pocock et al. | 725/98 |
| 5,850,266 A | 12/1998 | Gimby | |
| 6,493,872 B1 * | 12/2002 | Rangan et al. | 725/32 |
| 7,536,705 B1 * | 5/2009 | Boucher et al. | 725/112 |
| 8,085,855 B2 * | 12/2011 | Bennett | 375/240.26 |
| 2006/0080420 A1 * | 4/2006 | Backman et al. | 709/220 |
| 2008/0123967 A1 * | 5/2008 | Berini et al. | 382/218 |
| 2008/0192818 A1 * | 8/2008 | DiPietro et al. | 375/240.01 |
| 2008/0244676 A1 * | 10/2008 | DaCosta | 725/116 |
| 2008/0285643 A1 | 11/2008 | Diab | |
| 2010/0229210 A1 * | 9/2010 | Sharp et al. | 725/109 |
| 2010/0253840 A1 * | 10/2010 | Nave | 348/500 |
| 2011/0002376 A1 * | 1/2011 | Ahmed et al. | 375/240.01 |
| 2012/0038901 A1 * | 2/2012 | McKaughan et al. | 356/4.01 |

\* cited by examiner

*Primary Examiner* — Mark Rinehart
*Assistant Examiner* — Christopher R Crompton
(74) *Attorney, Agent, or Firm* — Edell, Shapiro & Finnan, LLC

(57) ABSTRACT

Systems and methods for real time data processing using a switching network and multiple digital signal processors (DSPs). In an embodiment, the system includes a first digital signal processor having a video port interface, a first interface disposed between the video port interface of the first digital signal processor and a switching network, a second digital signal processor having a video port interface, and a second interface disposed between the video port interface of the second digital processor and the switching network. The first interface is configured to parse a VSYNC line of a video frame that is output from the first digital signal processor via its video port interface to generate a multiplexing table based upon which scan lines of the video frame are broken up into packets compatible with the switching network such that the packets can be transmitted over the switching network and be received by the second interface and the second digital signal processor via its video port interface.

20 Claims, 6 Drawing Sheets

| 63 | 47 | 31 | 15 |
|---|---|---|---|
| # Of Sub-frame | Ethernet DA[47:32] | Ethernet DA[31:16] | Ethernet DA[15:0] |
| Ethernet SA[47:32] | Ethernet SA[31:16] | Ethernet SA[15:0] | 0x8100 |
| VLAN TAG | Ether Type | Stream ID | Frame# |
| Start Scan Line | End Scan Line | Length[31:16] | Length[15:0] |
| Reserved | Ethernet DA[47:32] | Ethernet DA[31:16] | Ethernet DA[15:0] |
| Ethernet SA[47:32] | Ethernet SA[31:16] | Ethernet SA[15:0] | 0x8100 |
| VLAN TAG | Ether Type | Stream ID | Frame# |
| Start Scan Line | End Scan Line | Length[31:16] | Length[15:0] |
| Reserved | ....... | ....... | ........ |

| 63 | 47 | 31 | 15 |
|---|---|---|---|
| # Of Sub-frame | Ethernet DA[47:32] | Ethernet DA[31:16] | Ethernet DA[15:0] |
| Ethernet SA[47:32] | Ethernet SA[31:16] | Ethernet SA[15:0] | 0x8100 |
| VLAN TAG | Ether Type | Stream ID | Frame# |
| Start Scan Line | End Scan Line | Length[31:16] | Length[15:0] |
| Reserved | Ethernet DA[47:32] | Ethernet DA[31:16] | Ethernet DA[15:0] |
| Ethernet SA[47:32] | Ethernet SA[31:16] | Ethernet SA[15:0] | 0x8100 |
| VLAN TAG | Ether Type | Stream ID | Frame# |
| Start Scan Line | End Scan Line | Length[31:16] | Length[15:0] |
| Reserved | ........ | ........ | ........ |

Fig. 3

| 63 | 47 | 31 | 15 |
|---|---|---|---|
| # Of Sub-frame Received | Stream ID | Frame# | Start Scan Line |
| End Scan Line | Frame Size [31:16] | Frame Size [15:0] | Status |
| Reserved | Stream ID | Frame# | Start Scan Line |
| End Scan Line | Frame Size [31:16] | Frame Size [15:0] | Status |
| Reserved | | | |

*Fig. 5*

TRANSPORTING REAL TIME VIDEO FRAMES OVER AN ETHERNET NETWORK

TECHNICAL FIELD

The present disclosure relates to network traffic routing and more particularly to transporting real time video from a first digital signal processor to a second digital processor over an Ethernet packet based network.

BACKGROUND

Digital signal processors (DSPs) are commercially available with a host of features including video encoding and decoding capabilities, large buffers/memories, and advanced input/output capabilities including 10/100/1000 Mb/s Ethernet and Universal Serial Bus (USB) control connectivity, among other features.

DSPs are particularly suited to handle video encoding, decoding, transcoding and transrating, and video imaging and video conferencing, among other applications. An advantage of such DSPs is their very high level of integration, leading those skilled in the art to refer to such devices as "system-on-chip" devices. These highly-capable devices are small, fast, and rich in features enabling them to process various types of incoming data to provide a desired specific output. As the demand for video related applications increases, so do the demands on these types of DSPs.

BRIEF DESCRIPTION OF THE DRAWINGS

FIG. 3 shows a frame header at the beginning of each video frame on a VSYNC line.

FIG. 5 shows a multiplexing table with status used by the DSP to process data stored in the memory of the DSP.

DESCRIPTION OF EXAMPLE EMBODIMENTS

Overview

Figure 1:
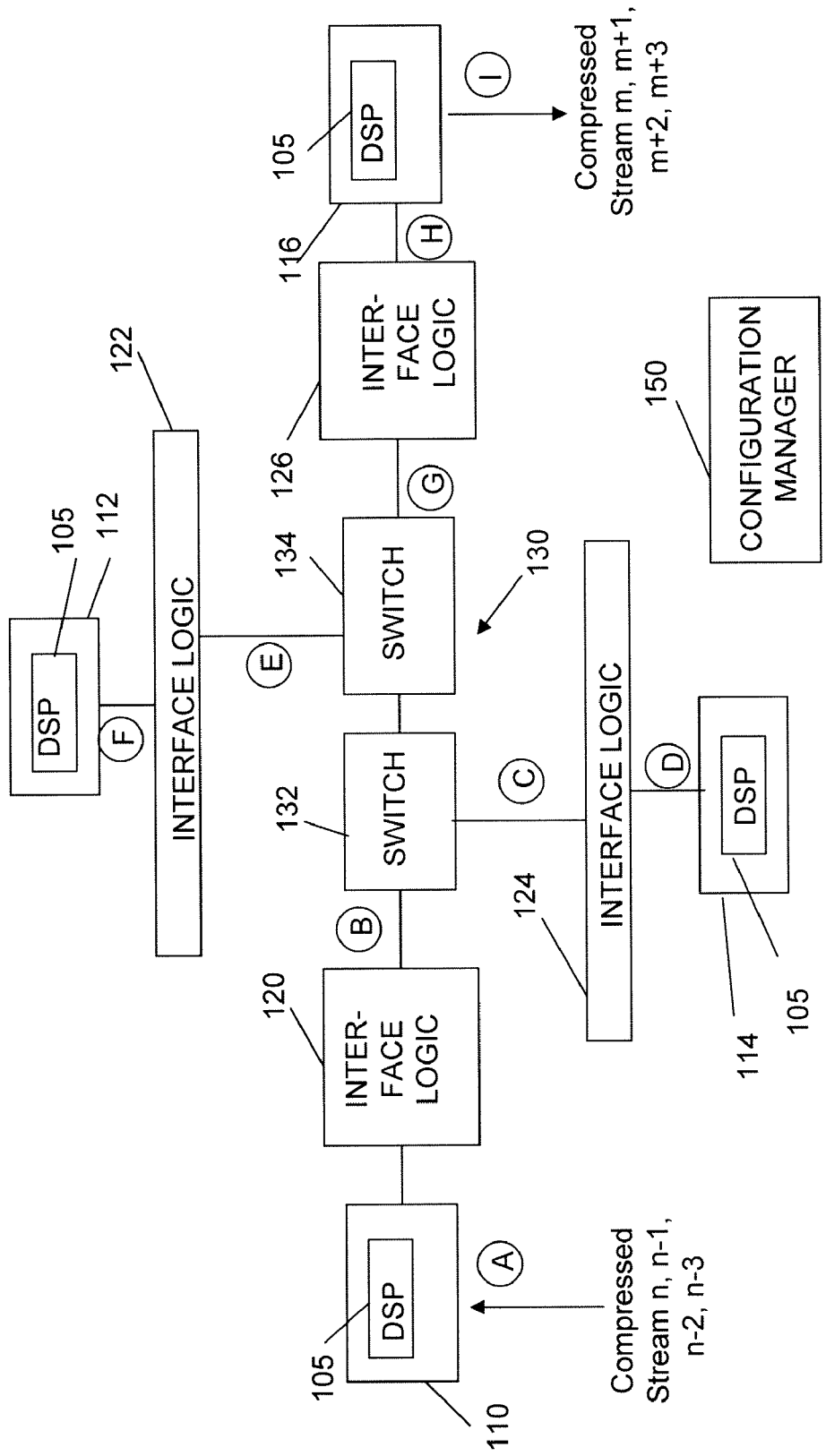
FIG. 1 shows a network topology for interconnecting multiple DSPs via an Ethernet switching fabric.

A system for real time data processing using a switching network and multiple digital signal processors (DSPs) is described herein. In an embodiment, the system includes a first digital signal processor having a video port interface, a first interface disposed between the video port interface of the first digital signal processor and a switching network, a second digital signal processor having a video port interface, and a second interface disposed between the video port interface of the second digital processor and the switching network. The first interface is configured to parse a VSYNC line of a video frame that is output from the first digital signal processor via its video port interface to generate a multiplexing table based upon which scan lines of the video frame are broken up into packets compatible with the switching network such that the packets can be transmitted over the switching network and be received by the second interface and the second digital signal processor via its video port interface.

A corresponding method includes processing video data with a first digital signal processor (DSP), wherein the DSP has a video port interface sufficient in bandwidth to receive and transmit real time video. The method further includes transmitting, via the video port interface of the first DSP, a video frame having a VSYNC line containing a header, wherein the header comprises information including a network destination address corresponding to a second digital signal processor, breaking the video frame into packets compatible with a switching network, wherein the packets are generated using the header information and active video data of the video frame, passing the packets to the switching network, receiving the packets at the destination address corresponding to the second DSP, reconstructing the video frame using the packets, and passing the thus reconstructed video frame to the second DSP via its video port interface for further processing.

Example Embodiments

As the demand for real-time video, and particularly high definition (HD) video, communications and processing continues to increase, there is a challenge to scale media processing platforms, especially to inter-connect multiple media processors to support real-time video processing requirements. Given the wide variety video coder/decoders (codecs), resolutions, and frame rates in use today, and the variety of video analysis, compositing, and processing that is best performed in the uncompressed video domain, a flexible and cost effective approach is described herein to share video and desired processing across multiple digital signal processors. Also, for any platform that attempts to dynamically allocate resources in meeting a wide range of video processing requests, there is described herein a flexible way to pipeline and parallelize the processing across a large number of processing elements, some of which may be optimized to perform a subset of video processing functions. To accomplish this, a high-speed and robust interconnection infrastructure such as 10 or 20 Gb/s Ethernet is leveraged.

Many consumer grade DSPs provide external interfaces such as Peripheral Component Interface (PCI) and Gigabit Ethernet for data communication. However the bandwidth available with these interfaces is not sufficient to support, e.g., 1080 p30 or higher frame rates that require raw bandwidth on the order of 1 Gigabit/sec or more. Thus, such interfaces are not suitable for interconnecting multiple processors with a view to achieve real time video processing. Moreover, these interfaces are not synchronous and, as such, require a complicated underlying software structure to make them synchronous with real time video frame rates. Another approach to enable multiple DSPs to operate together (in parallel or series) might be to share the DSPs' high-speed local memory interface. However, such a shared memory approach does not typically work given the signal integrity limitations of greater than 300 MHz DDR2 memory that the DSPs use.

Rather than relying on the lower speed DSP external interfaces or the shared memory approach for DSP interconnection, embodiments described herein rely instead on a DSP's video port interface (VPIF). More specifically, many modern commercially-available DSPs provide a video port interface (VPIF) to connect to output display and video ingestion devices such as cameras. The bandwidth of this interface is high enough to support high-definition video for HDTV (high definition television), as defined by the International Telecommunications Union's (ITU's) BT.1120 standard, and is synchronous based on frames.

Described herein are systems and methodologies to combine the high bandwidth and synchronous nature of the DSP's VPIF with the dynamic addressing, interconnection and sharing flexibility of packet-based networks, including a 10 (or 20) Gigabit Ethernet switching fabric. This transparently allows video to be delivered out of, or received into, DSP processors, while adding the advantages of a commodity switched packet-based network. Once the video is packetized, the switch fabric enables the system to become a highly scalable media processing platform.

As will be described in more detail below, an interface, implemented in hardware in one possible embodiment or in software in another embodiment, is provided that exchanges associated control and format information and adapts to the number and resolutions of all the different video streams processed by a given DSP that needs to be forwarded to one or more other processing nodes (e.g., other DSPs). The interface logic may be implemented within the DSP itself.

In one embodiment, real time video frame data coming out of a DSP's BT.1120 compliant type VPIF is converted to VLAN-tagged Ethernet packets for connecting devices over a network switching fabric. The interface is, in an embodiment, synchronous and runs at video frame rates. As such, each participating DSP in the network or "mesh" can perform one or more tasks on a frame or sub-frame (less than a full frame) as an element in a complex video pipeline.

On the transmit side, logic (although, again, the same functionality could be implemented with appropriate software code) collects and decodes all the standard BT.1120 (or other protocol) timing codes and extracts and encapsulates the active video data coming out of the video port interface. To increase the capacity of this port, blanking intervals can be utilized to carry video data. This increases the capacity of the port and can be used to carry any type of data.

Only two VSYNC lines are used to start and end an individual frame. The VSYNC line is utilized to carry header information so that the interface logic (or simply "interface") does not need any prior programming. The header contains information such as destination address (unicast or multicast), VLAN tag information, stream identification number, frame size in terms of scan line, etc. Each frame is preceded by a header and contains the necessary information for routing the video data to one or many destinations. The DSP at the transmit side can modify its frame destination at the beginning of each frame which makes channel switching from DSP to DSP un-interrupted.

As the interface logic parses the video frame from the DSP video port interface it, at the same time, breaks the video frame into packets. Each packet contains sufficient information for routing the packet through the Ethernet switching network to its intended destination, i.e., another DSP. The packet also contains the required identity information of the video stream such as source, stream identification, frame number, scan lines, and sequence numbers, etc. This allows the receiving side to reconstruct video frames for a certain video stream.

The receiving interface logic similarly extracts header information from the incoming packets from the Ethernet network, strips off the header, inserts timing codes and forwards the video frame to the receiving DSP's BT.1120 type VPIF. At the end of a frame, the header information is forwarded to the DSP during the VSYNC line so that the receiving DSP can identify the location, size, and channel identification of the received frame/sub-frames. Now the receiving DSP can operate on the received frame to perform its video processing tasks.

The video ports employed by the system described herein are generally full duplex so that a single DSP, once complete with processing a frame, can schedule the processed frame to the next DSP in the path. This provides a very effective low cost low latency multiprocessing pipeline structure for high bandwidth video processing system.

FIG. 1 depicts a plurality of DSPs 105 arranged on respective DSP "blades" 110, 112, 114, 116. Each blade 110, 112, 114, 116 may contain any number of DSPs 105 (typically four, although only one is shown in the drawing). Each blade 110, 112, 114, 116 is in communication with respective interface logic 120, 122, 124, 126. And each interface logic 120, 122, 124, 126 is in communication with a packet-switched network 130, such as a 10 or 20 Gb/s Ethernet switching fabric. Blades 110, 112, 114, 116 may be components that fit into a standard network rack system that facilitates connectivity with a switching network 130.

Based on the stream characteristics, each DSP 105 can accept one or more compressed video streams n, n−1, n−2, etc., shown on the left hand side of FIG. 1, such as a video stream compliant with the H.264 standard. After decoding and possibly performing other processing operations, the DSP 105 on blade 110 forwards the uncompressed video frame to interface logic 120 via its VPIF. Interface logic 120 (or processor) may be implemented as an Application Specific Integrated Circuit (ASIC) or a Field Programmable Gate Array (FPGA), and includes sufficient on-board memory to handle the functionality described herein.

More specifically, and still with reference to FIG. 1, an incoming compressed video stream enters the system at A to DSP 105 on blade 110. This first DSP will typically decode and process the video frame. Once decoded and processed, the DSP 105 on blade 110 places the frame in the next "frame-to-be transmitted" memory of the DSP 105. On the next frame transmit time, the Direct Memory Access (DMA) engine in the DSP 105, in conjunction with the BT.1120 encoding dedicated logic on-board the DSP 105, transmits the frame data to the video port interface (VPIF) that is in communication with the interface logic 120.

The interface logic or module 120 parses the VSYNC line for header data and builds an appropriate multiplexing table. After the VSYNC line, the active video frame data appears. Based on the multiplexing table, the interface logic 120 extracts the proper scan lines and breaks them into packets compatible with the packet switched network 130. Headers are added to the packets from the multiplexing table and then the packet is forwarded to the connected switch, in this case switch 132 of, e.g., a 10G or 20G Ethernet switching fabric. As shown, the packets are passed to the network 130 at B.

Based on the destination address of respective packets, at locations C and E (via switches 132 and 134, respectively) in FIG. 1, the frame (i.e., the packets that comprise the given frame) may exit the switch mesh 130 and reach a DSP 105 on blade 112 or 114 at F or D, for additional processing. The additional processing may include transcoding, transrating, and/or adding graphics, among other processing functions. Once the processing is completed, the DSP 105 returns the frame back to the network 130 via interface logic or module 122, 124 respectively. The frame keeps moving to different DSPs based on the processing requirements established by, e.g., a configuration manager module 150 that is in communication with each of the DSPs 105 via, e.g., their standard 1 G/s external interfaces. That is, each DSP is given instructions regarding the destination address of a next DSP in an overall processing pipeline. When the processing is complete, the frame (in the form of packets) reaches the final interface logic or module 126 at G. The interface logic 126 maintains a reconstruction scan line buffer which is filled with payload data of the incoming packets. At H, scan line data is forwarded to the final DSP 105 on blade 116 in the pipeline via its video port interface. This final DSP 105, for example, compresses and encodes the video frame in the target format for delivery. The compressed video then exits the system at location I.

Figure 2:
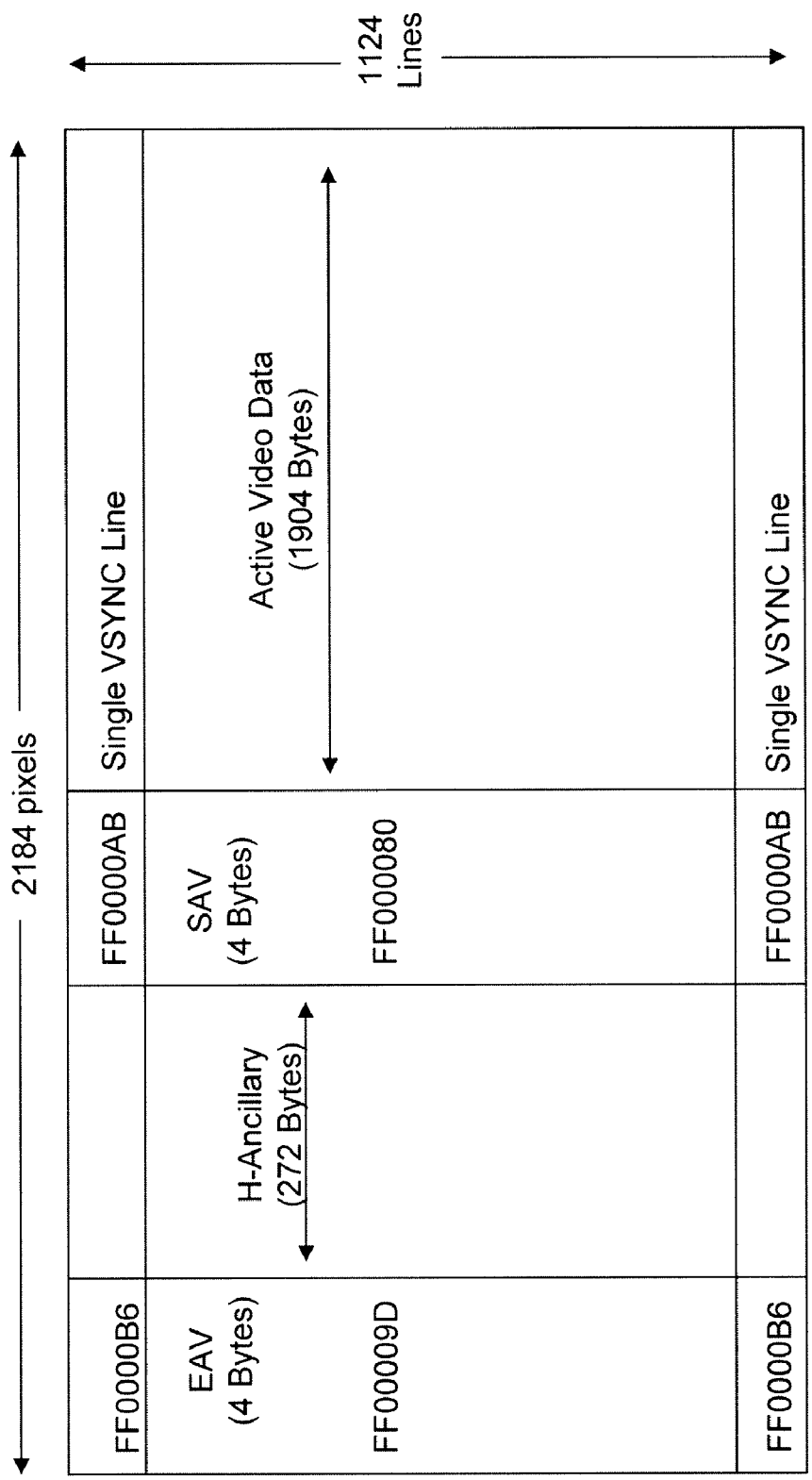
FIG. 2 shows a single video frame structure at a video port of the DSP.

In accordance with an embodiment, all the video port interfaces of all the DSPs 105 are synchronized and start at the same time. The proposed frame structure is shown in FIG. 2 where the video port interface clock is running at 74.25 MHz. This provides a frame rate of up to 30.246 frames per second. The video frame size and its structure are defined at the start of the video port interface output in a VSYNC line.

More specifically, as shown in FIG. 2, a frame is bounded by two vertical synchronization (VSYNC) lines. The first VSYNC line contains the header information and describes the content of the frame, including the ancillary and active video area. In FIG. 2 "EAV" designates the end of active video and "SAV" designates the start of active video.

The header format is shown in the FIG. 3 as it is placed in the memory of a DSP 105. For purposes of example, a 64-bit memory is employed. Transmission order is from most significant bit (MSB) to least significant bit (LSB). Thus, for a video port interface width of 16 bits the order of transmission is bits 63-48, 47-32, 31-16, and finally 15-0. Each header is 32 bytes long. A VSYNC line can define as many as 128 distinct sub frames for a complete video port frame. If the DSP is idle with no data to transmit, the # Of Sub-frame field is set to 0. This causes the interface logic 120, 122, 124, 126 not to send any packets to the network. In FIG. 3, header information for two subframes is depicted (indicated by the fields between the bold lines).

Each element of the header placed in the video frame VSYNC line and shown in FIG. 3 is described next.

Of Sub-frame: Defines how many distinct streams are getting sent to other DSPs in the data part of the frame. This allows multiplexed processing of many channels for low bandwidth applications. In practical terms, the largest frame can be 1122 lines with 2176 pixels and the smallest frame can consist of a single scan line of 2176 pixels.

Ethernet Destination Address: media access control (MAC) address of the recipient DSP (and associated interface logic).

Ethernet Source Address: MAC address of the transmitting DSP (and associated interface logic).

VLAN TAG: Virtual local area network tag value.

Ether Type: Hex 0103 to indicate uncompressed video data.

Stream ID: A 16 bit number to identify a video stream in the system. The DSP 105 assigns this field.

Frame#: A 16 bit number starting with 1 and wrapping after 64 k frames.

Start Scan Line: The sub-frame start location in the frame.

End Scan Line: The sub-frame end location in the frame.

Length in bytes: The sub-frame length in bytes. This value can simplify locating lost data in the video stream.

The foregoing header fields are repeated based on the number of sub-frames in a video port frame, i.e., the value of "# Of Sub-frame". FIG. 3 shows header fields for two subframes.

Packets are created in the interface logic 120, 122, 124, 126 based on the header generated by the respective DSP 105. In one implementation, once the proper scan line appears, the interface logic 120, 122, 124, or 126 breaks the video data into packets with, e.g., four packets/scan line. Each packet is 1120 bytes long with payload of 1088 bytes. The packet format is shown in the FIG. 4.

Figure 4:
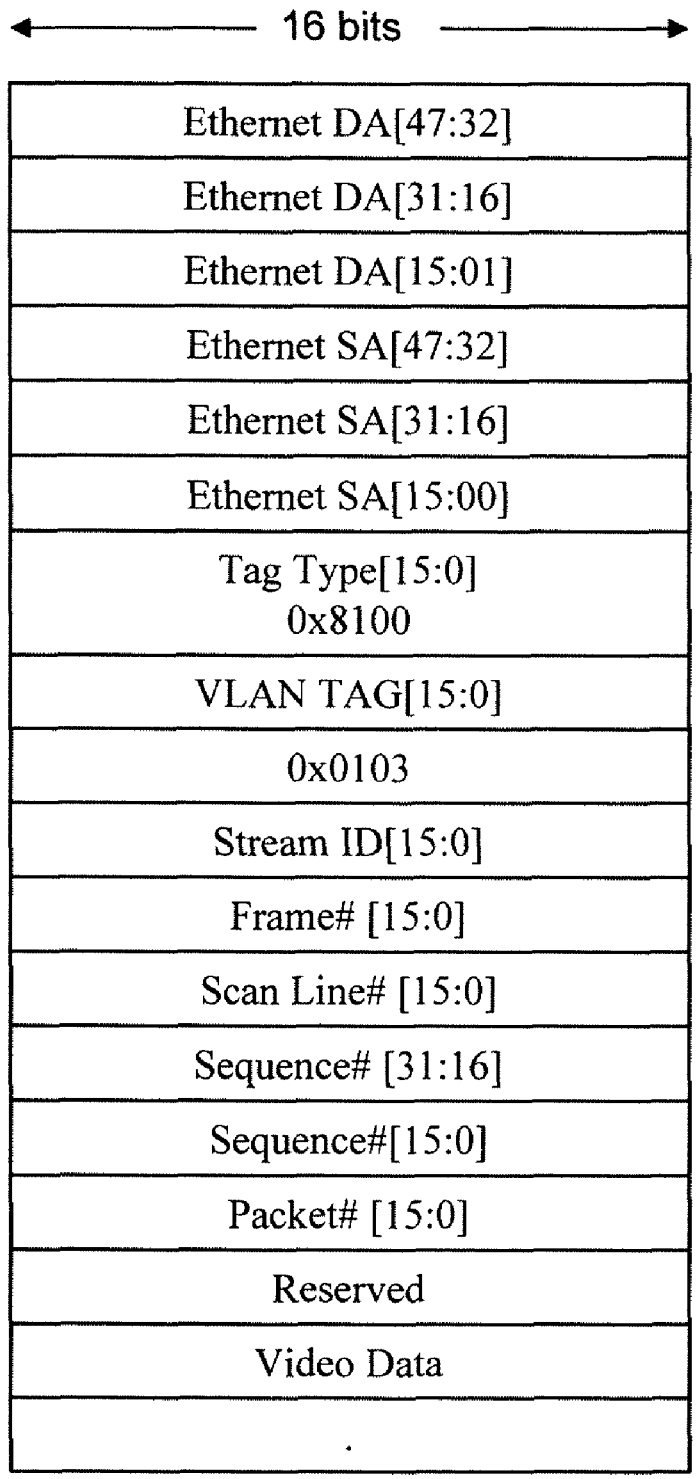
FIG. 4 depicts video data packets in the Ethernet network.

The fields in FIG. 4 are the same as those in the header data, except as follows:

Sequence #: This defines the remaining bytes to be sent for a sub-frame including this packet.

Packet #: The first packet number is 0 and is incremented sequentially.

At the receiver side, the interface logic, 120, 122, 124, 126 as the case may be, receives packets and based on the stream ID, packet number and line number it places the payload into a receiver scan line buffer. The size of the scan line buffer depends on the maximum jitter the packets may experience in the switching network 130. As the payloads are deposited in the scan line buffer, the headers are used to build a receiver de-multiplexing table. As the payloads are written, the deposited video data is sent to the video port interface of the DSP with proper BT.1120 timing SYNC codes.

The DSP's BT.1120 DMA engine deposits the incoming scan line data to the local memory of the DSP 105. At the end of a video port frame, the de-multiplexing table with status is sent to the DSP during the VSYNC line of the frame. The format of this table is shown in FIG. 5. The status reflects the consistency of the frame, reporting delayed packets, missing packets and helps the receiving DSP 105 to take special actions as needed. The status information with respect to two subframes (indicated by the fields between the bold lines) is shown in FIG. 5.

Once the VSYNC line is received, the DSP receives an interrupt from the DSP BT.1120 logic. At this point the DSP can identify the valid sub-frames received in the deposited video port frame memory area of the DSP and start processing the frame and sub-frames.

Figure 6:
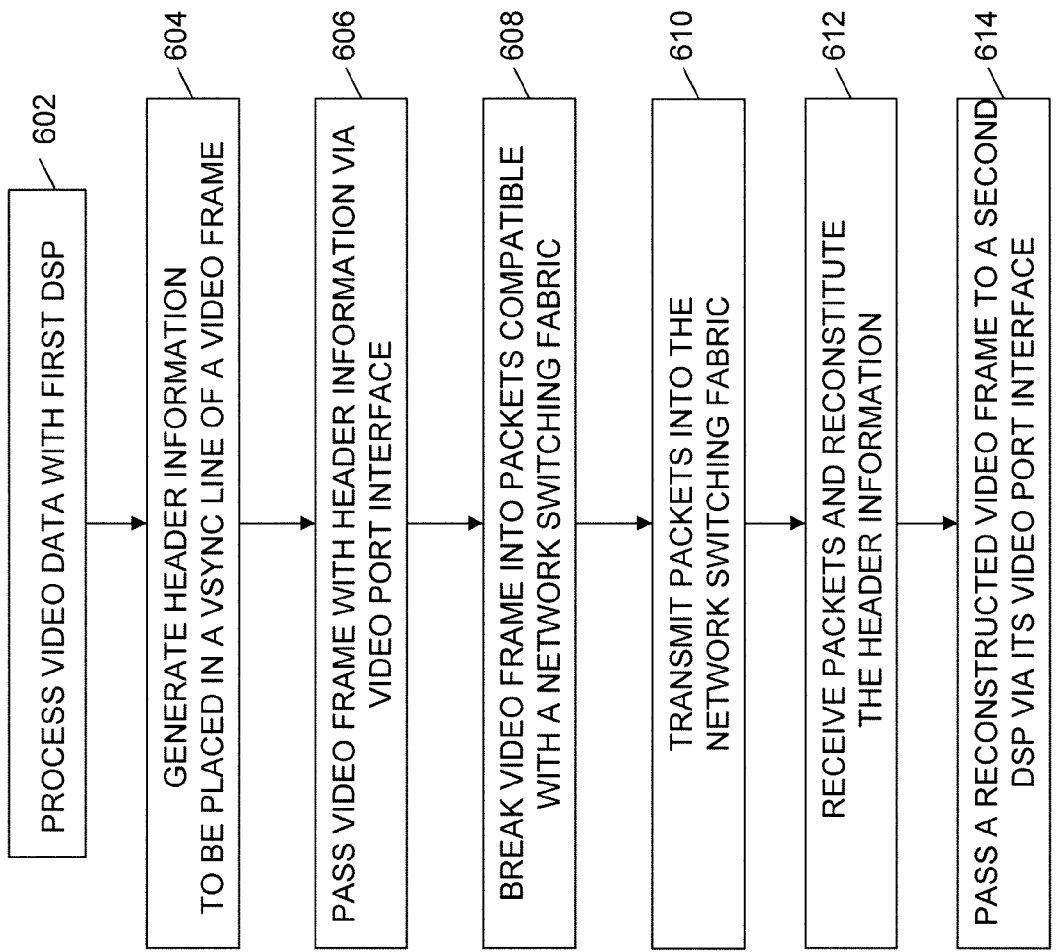
FIG. 6 is a flow chart that depicts a series of steps for transporting real time video over an Ethernet network.

FIG. 6 depicts a flow chart of a series of steps for transporting real time video over an Ethernet network using, e.g., a DSP's BT.1120 compliant video port interface and associated interface logic as discussed herein.

At step 602, a first DSP processes a video frame. Upon completion of that processing, the DSP, at step 604 generates header information that is to be placed in a VSYNC line of the processed video frame that is to be passed out of the DSP. At 606, the video frame is transmitted from the DSP via its video port interface which, as explained herein, can be compliant with the BT.1120 standard.

At step 608, the video frame is broken into packets compatible with a network switching fabric, such as a high speed 10G or 20G Ethernet network. Headers of the packets are generated using the header information supplied in the VSYNC by the DSP. At step 610, the packets are transmitted into the network switching fabric so that the packets are sent to an intended next DSP in an overall processing pipeline. At step 612, the packets are received and the header information supplied in the VSYNC line of the frame is reconstituted such that, at step 614, when a reconstructed video frame is passed to the next DSP via its video port interface, the DSP can properly determine how to process the frame (e.g., is the frame a single frame, or does the frame contain multiple sub-frames). Ultimately, a final DSP may output a compressed, fully processed, video frame.

In sum, embodiments described herein provide, among other things, interface logic for interfacing, e.g., BT.1120 interfaces to a networking switching fabric, such as a 10G Ethernet network, a packet format defined to transfer real-time video frames over a packet oriented network, and a header structure configured to send frame data from one DSP to one or more (in the case of multicasting) subsequent DSPs in a pipeline.

Embodiments described herein also enable a single video port frame to contain many sub-frames destined to different DSPs. This allows multiplexing of channels on a single DSP for processing multiple channels such as standard definition (SD), Common Intermediate Format (CIF), etc.

Although the system and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following.

What is claimed is:

1. A method, comprising:
    receiving a video frame;
    parsing a vertical synchronization (VSYNC) line of the video frame that includes a header having a plurality of fields that describe, respectively, a number of subframes in the video frame, respective network destination addresses for the subframes, each network address being associated with a video data processor that is to be used for subsequent processing of a given subframe of the video frame, and start and end scan lines of the respective subframes within the video frame;
    breaking the video frame into packets, wherein the packets include the respective destination network addresses; and
    passing the packets to a network via which the respective destination network addresses can be accessed.

2. The method of claim 1, further comprising receiving the video frame from a digital signal processor.

3. The method of claim 2, further comprising receiving the video frame from a video port interface of the digital signal processor.

4. The method of claim 1, further comprising parsing the VSYNC line to obtain information about subframes within the video frame.

5. The method of claim 1, further comprising generating a multiplexing table that is used to add header information to the packets.

6. A device, comprising:
    an interface configured to receive a video frame having a vertical synchronization (VSYNC) line that includes a header having a plurality of fields that describe, respectively, a number of subframes in the video frame, respective network destination addresses for the subframes, each destination network address being associated with a video data processor to be used for subsequent processing of a given subframe of the video frame, and start and end scan lines of the respective subframes within the video frame;
    the interface further configured to parse the VSYNC line of the video frame for the destination network address, break individual scan lines of the video frame into packets, wherein the packets include the respective destination network addresses, and pass the packets to a network via which the destination network addresses can be accessed.

7. The device of claim 6, wherein the video frame is received from a digital signal processor via a video port interface of the digital signal processor.

8. The device of claim 6, wherein the device is further configured to parse the VSYNC line to obtain information about subframes within the video frame.

9. The device of claim 6, further configured to generate a multiplexing table that is used to add header information to the packets.

10. The device of claim 6, wherein the device is configured to receive the video frame in accordance with the International Telecommunications Union's BT.1120 standard.

11. A method, comprising:
    receiving a plurality of packets;
    processing the packets to assemble a video frame including a vertical synchronization (VSYNC) line, the VSYNC line including a header having a plurality of fields that describe, respectively, a number of subframes in the video frame, respective network destination addresses for the subframes, each destination network address being associated with a video data processor to be used for subsequent processing of a given subframe of the video frame, and start and end scan lines of the respective subframes within the video frame; and
    generating a de-multiplexing table with status information using the header in the VSYNC line.

12. The method of claim 11, further comprising passing the video frame to the digital signal processor via a video port interface thereof.

13. The method of claim 12, further comprising passing the video frame to the digital signal processor in accordance with the International Telecommunications Union's BT.1120 standard.

14. The method of claim 11, further comprising obtaining a location of a start scan line and an end scan line of a selected subframe in the video frame.

15. The method of claim 11, further comprising obtaining a stream identification (ID) from the VSYNC line.

16. A device, comprising:
    an interface configured to receive a plurality of packets and to process the packets to assemble a video frame including a vertical synchronization (VSYNC) line, wherein the VSYNC line includes a header having a plurality of fields that describe, respectively, a number of subframes in the video frame, respective network destination addresses for the subframes, each destination network address being associated with a video data processor to be used for subsequent processing of a given subframe of the video frame, and start and end scan lines of the respective subframes within the video frame, the interface further configured to generate a de-multiplexing table with status information using the header in the VSYNC line.

17. The device of claim 16, in communication with a video port interface of a digital signal processor.

18. The device of claim 16, wherein the interface is configured to obtain a stream identification (ID) value from the VSYNC line.

19. The device of claim 16, wherein the interface is configured to obtain an indication of a start scan line and an end scan line corresponding to a subframe within the video frame.

20. The device of claim 16, wherein the interface is part of a digital signal processor.

* * * * *